(12) United States Patent
Cho et al.

(10) Patent No.: US 9,529,492 B2
(45) Date of Patent: Dec. 27, 2016

(54) REPRODUCTION OF FILE SERIES

(71) Applicant: Samsung Electronics Co., Ltd., Gyeonggi-do (KR)

(72) Inventors: Jaewan Cho, Gyeonggi-do (KR); Soonhyun Cha, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 242 days.

(21) Appl. No.: 14/261,738

(22) Filed: Apr. 25, 2014

(65) Prior Publication Data

US 2014/0337322 A1    Nov. 13, 2014

(30) Foreign Application Priority Data

May 13, 2013    (KR) .................. 10-2013-0053534

(51) Int. Cl.
| | | |
|---|---|---|
| *G06F 17/30* | (2006.01) | |
| *G06F 3/0481* | (2013.01) | |
| *G11B 27/10* | (2006.01) | |
| *G11B 27/34* | (2006.01) | |
| *G06F 3/0484* | (2013.01) | |

(52) U.S. Cl.
CPC ....... *G06F 3/04817* (2013.01); *G06F 3/04842* (2013.01); *G06F 17/30053* (2013.01); *G06F 17/30058* (2013.01); *G06F 17/3084* (2013.01); *G06F 17/30772* (2013.01); *G06F 17/30775* (2013.01); *G06F 17/30849* (2013.01); *G11B 27/105* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 2001/0026287 A1* | 10/2001 | Watanabe | G06F 21/10 715/764 |
| 2003/0236582 A1 | 12/2003 | Zamir et al. | |
| 2005/0240661 A1 | 10/2005 | Heller et al. | |
| 2006/0165380 A1 | 7/2006 | Tanaka et al. | |
| 2006/0206819 A1 | 9/2006 | Tsuji et al. | |
| 2008/0019240 A1 | 1/2008 | Araki et al. | |
| 2008/0120571 A1* | 5/2008 | Chang | G06F 3/0483 715/810 |
| 2008/0319856 A1* | 12/2008 | Zito | G06F 17/30873 705/14.73 |

(Continued)

FOREIGN PATENT DOCUMENTS

| | | |
|---|---|---|
| KR | 10-2010-0113922 A | 10/2010 |
| KR | 10-1162395 B1 | 7/2012 |
| WO | 2005/106878 A2 | 11/2005 |

OTHER PUBLICATIONS

Podcast Addict, Mark podcast as listened when is 95% done, Jul. 25, 2013, accessed Aug. 3, 2016 at https://podcastaddict.uservoice.com/forums/211997-general/suggestions/4230275-mark-podcast-as-listened-when-is-95-done.*

*Primary Examiner* — William Spieler
(74) *Attorney, Agent, or Firm* — Cha & Reiter, LLC (57) ABSTRACT

Disclosed are a method and an apparatus for managing a series of files. A series of files may be grouped and a reproduction progress of a most recently reproduced file may be tracked. The next serial file in the series is reproduced, when the reproduction progress of the most recently reproduced file satisfies a threshold.

18 Claims, 7 Drawing Sheets

(56) References Cited

U.S. PATENT DOCUMENTS

2009/0153389 A1 6/2009 Kerr et al.
2011/0296047 A1 12/2011 Orr
2013/0145291 A1* 6/2013 Weber .................. G06F 3/0481
 715/760

* cited by examiner

REPRODUCTION OF FILE SERIES

CROSS-REFERENCE TO RELATED APPLICATION

This application claims priority from and the benefit under 35 U.S.C. §119(a) of Korean Patent Application No. 10-2013-0053534, filed on May 13, 2013, which is hereby incorporated by reference herein.

BACKGROUND

1. Field

The present disclosure relates generally to a method and an apparatus for managing and displaying a file. More particularly, the present disclosure relates to a method and an apparatus for managing and displaying a file, which group files having continuity in one folder and intuitively display, to a user, a file scheduled to be reproduced next according to order among the grouped files.

2. Description of Related Art

Recently, portable devices, such as mobile communication devices, Personal Digital Assistants (PDA), electronic organizers, smart phones, tablets and the like, have grown in popularity due to major advancements in digital technology. The market for such portable devices has rapidly grown due to various attractive designs and applications linked with these portable devices.

For example, smart phones are now capable of downloading various applications for capturing photographs and moving images, reproducing audio/video signals, playing on-line games, viewing broadcast programs, using a social services, etc. These portable devices may include a touch screen and may provide a user interface that allows a user to manage items through the touch screen.

SUMMARY

Unfortunately, due to the assortment of multimedia files that may be downloaded to a portable device, users may find it difficult to manage all these different file types. The multimedia files may be displayed in a confusing and disorganized fashion such that it becomes burdensome to reproduce these files each time the file is viewed. For example, a user may stop viewing a streaming series of movie files at a certain point and may not remember the last frame viewed in the movie. In this instance, the user may have to spend time searching through the file series to determine where the user left off in the series. The present disclosure has been made to address the foregoing problems. Accordingly, examples described in the present disclosure provide a method and an apparatus for managing a series of files.

In one aspect, a method for managing and displaying a series of files may comprise: grouping a series of files in which the series of files are reproduced in a sequential order; tracking a reproduction progress of a most recently reproduced file; identifying a next serial file to be reproduced in accordance with the sequential order, when the reproduction progress of the most recently reproduced file satisfies a preset threshold; and storing metadata associated with the next serial file, when the next serial file is identified.

In accordance with another aspect of the present disclosure, an apparatus for managing and displaying a series of files may comprise a control unit to: group a series of files in which the series of files are reproduced in a sequential order; track a reproduction progress of a most recently reproduced file; identify a next serial file to be reproduced next in accordance with the sequential order, when the reproduction progress of the most recently reproduced file satisfies a preset threshold; store metadata associated with the next serial file in a storage unit, when the next serial file is identified; and display the next serial file at a particular position on a display unit.

BRIEF DESCRIPTION OF THE DRAWINGS

The above features and advantages of the present disclosure will be more apparent from the following detailed description in conjunction with the accompanying drawings, in which.

DETAILED DESCRIPTION

Hereinafter, a method and an apparatus for managing and displaying a file, in accordance with aspects of the present disclosure, will be described in detail with reference to the accompanying drawings. In the following description of the present disclosure, a detailed description of known functions and configurations incorporated herein will be omitted when it is determined that the detailed description thereof may unnecessarily obscure the subject matter of the present disclosure.

Prior to making a detailed description of the present disclosure, the terms and words used in the present specification and claims should not be interpreted as being limited to their typical meaning based on the dictionary definitions thereof, but should be interpreted to have the meaning and concept relevant to the technical spirit of the present disclosure. Accordingly, the examples described in the present specification and drawings should not be construed to limit the scope of the appended claims. Therefore, it should be understood that various equivalents and modified examples capable of replacing these examples may exist at the time when this application was filed.

A method and apparatus for managing and displaying a file, in accordance with aspects of the present disclosure, may be applied to all types of information communication devices and all types of multimedia devices, such as a Moving Picture Experts Group-1 Audio Layer-3 (MP3) player, a Portable Multimedia Player (PMP), a Personal Digital Assistant (PDA), a tablet PC, a mobile phone, a smart phone, etc. and may be applied to the applications of them. Hereinafter, a case will be described in which a portable device in accordance with aspects of the present disclosure corresponds to a smart phone.

Figure 1:
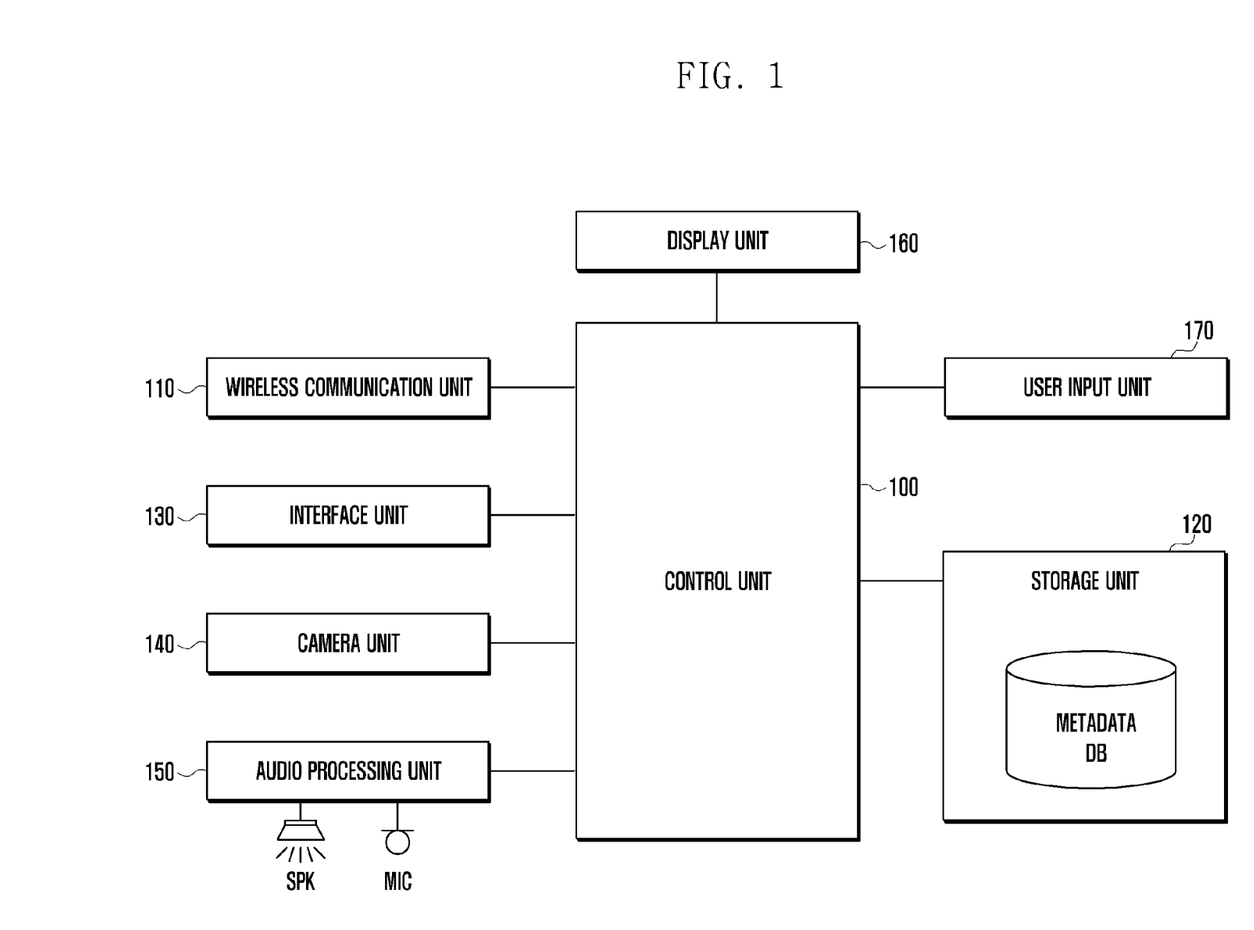
FIG. 1 is a block diagram illustrating an example apparatus for displaying and managing a file in accordance with aspects of the present disclosure.

Referring to FIG. 1, a block diagram of an example apparatus for displaying and managing a file is shown. In the example of FIG. 1, the apparatus for displaying and managing a file may include a control unit 100, a wireless communication unit 110, a storage unit 120, an interface unit 130, a camera unit 140, an audio processing unit 150, and a display unit 160. In another example, the portable device may not necessarily include the elements illustrated in FIG.

1 as essential elements. Accordingly, the portable device may be implemented so as to include more elements than those illustrated in FIG. 1, or may be implemented so as to include fewer elements than those illustrated in FIG. 1.

The wireless communication unit 110 may include one or more modules which enable wireless communication between the portable device and a wireless communication system or between the portable device and another portable device. For example, the wireless communication unit 110 may include a mobile communication module, a Wireless Local Area Network (WLAN) module, a short-range communication module, a location calculation module, a broadcast receiving module, and the like.

The mobile communication module transmits and receives wireless signals to/from at least one of a base station, an external terminal and a server through a mobile communication network. Examples of the wireless signal may include a voice call signal, a video call signal, and data in various forms according to the transmission and reception of text/multimedia messages.

According to the control of the control unit 100, the mobile communication module may connect to a provider server, a content server, or the like, and may download content, such as an image file, a moving image file, a sound source file and the like, in a file form.

The WLAN module enables the portable device to connect to a wireless Internet, and forms a WLAN link between the portable device and another portable device. The WLAN module may be mounted inside or outside the portable device. Use may be made of Wireless Internet technologies, such as WLAN (Wi-Fi), Wireless broadband (Wibro), World Interoperability for Microwave Access (Wimax), High Speed Downlink Packet Access (HSDPA), and the like.

The short-range communication module is used for short-range communication. Use may be made of short-range communication technologies, such as Bluetooth, Radio Frequency Identification (RFID), Infrared Data Association (IrDA), Ultra Wideband (UWB), ZigBee, Near Field Communication (NFC), and the like. When the portable device is connected to another portable device through short-range communication, the short-range communication module may transmit content including metadata and the like to another portable device, or may receive content including metadata and the like from another portable device.

The user input unit 170 generates input data for controlling an operation of the portable device, in response to a user input. The user input unit 170 may include a keypad, a dome switch, a touch pad (static pressure/capacitance), a jog wheel, a jog switch, and the like. Also, the user input unit 170 may be implemented in the form of buttons on an outer surface of the portable device, and some buttons may be implemented by using a touch panel. For example, the user input unit 170 may generate command data for grouping files having continuity (i.e., files configured so as to have multiple ordinal positions) in one folder, may generate a user input for opening a folder in which files are grouped, or may generate a user input for executing a displayed file scheduled to be reproduced.

The interface unit 130 may serve as a passage to all external devices connected to the portable device. The interface unit 130 may allow the portable device to receive a series of files configured so as to have multiple ordinal positions from an external device (e.g., a headset, etc.), or may allow the portable device to transmit grouped series of files stored in the portable device, metadata of the grouped series of files and the like to the external device (e.g., the headset, etc.). Also, the interface unit 130 is supplied with power from an external device (e.g., a power supply unit), and delivers the power to each element within the portable device. For example, the interface unit 130 may include a wired/wireless headset port, an external charger port, a wired/wireless data port, a memory card port, a port for connecting the portable device to a device including an identity module, an audio Input/Output (I/O) port, a video I/O port, a headset (or earphone) port, and the like.

The camera unit 140 may be mounted on at least one of a front surface and a rear surface of the portable device, and may capture images of a background, an object, a person, and the like around the portable device and may deliver the acquired image to the control unit 100 and the storage unit 120. The camera unit 140 may include at least one of an infrared camera and a typical camera.

The storage unit 120 may store programs for processing and control performed by the control unit 100, or may temporarily store input/output data. Examples of the input/output data may include a series of files having multiple successive ordinal positions, metadata including information on a file scheduled to be reproduced, and the like. Under the control of the control unit 100, the storage unit 120 may store data generated by the portable device, or data received from an external device (e.g., a server, a desktop PC, a smart phone, etc.) through the wireless communication unit 110 or an interface unit of the external device.

The storage unit 120 may store the frequency of use, the level of importance, and priority according to the operation of a function of the portable device, together. Examples of the frequency of use may include the frequency of use of execution of a function of managing and displaying files having continuity, and the like. The storage unit 120 may store data on vibrations and sounds of various patterns, which are output in response to a touch input on a touch screen of the portable device.

Particularly, the storage unit 120 may store metadata including at least one of a file matched to at least one content, an identifier of the file, an author of the content, a title thereof, a topic thereof, an acquisition scheme thereof and an acquisition date thereof. Also, the storage unit 120 may add information on a file scheduled to be reproduced, that the control unit 100 has determined, to the metadata, and may store the metadata to which the information is added. The information on the file scheduled to be reproduced may be information on the position and size of the file scheduled to be reproduced which is displayed in a folder, and information on a particular character, symbol, number, icon, etc. which are displayed together with the file scheduled to be reproduced.

The storage unit 120 stores a booting program and an Operating System (OS) for operating the portable device. The storage unit 120 stores an embedded application and a third party application. The term "embedded application" refers to an application basically installed in the portable device. For example, the embedded application may be a browser, an e-mail, an instant messenger, and the like. As is well known, the term "third party application" refers to an application which may be downloaded from an online market to the portable device and installed in the portable device, and there are various types of third party applications. The third party application may be freely installed and controlled. When the portable device is turned on, the booting program is first loaded into a main memory (e.g., a Random Access Memory (RAM)) of the control unit 100. The booting program loads the OS into the main memory so as to enable the portable device to operate. Also, the OS loads applications into the main memory, and executes the loaded applications. The relevant booting and loading are a widely-known technology in a computer system, and thus a detailed description thereof will be omitted.

The storage unit 120 may include a storage medium of at least one type from among a flash memory type, a hard disk type, a multimedia card micro type, a memory card type (e.g., a Secure Digital (SD) or eXtreme Digital (XD) memory card), a Random Access Memory (DRAM), a Static RAM (SRAM), a Read Only Memory (ROM), a Programmable ROM (PROM), an Electrically Erasable PROM (EEPROM), a Magnetic RAM (MRAM), a magnetic disk, an optical disk, and the like. The portable device may also operate in relation to a web storage which performs a storage function of the storage unit 120 on the Internet.

The audio processing unit 150 delivers an audio signal, which has been received as input from the control unit 100, to a speaker (SPK), and delivers an audio signal such as voice and the like, which has been received as input from a microphone (MIC), to the control unit 100. According to the control of the control unit 100, the audio processing unit 150 may convert sound data such as voice/sound into an audible sound and may output the audible sound, through the SPK. The audio processing unit 150 may convert an audio signal, such as voice and the like, which has been received from the MIC, into a digital signal, and may deliver the digital signal to the control unit 100.

The SPK may output audio data received from the wireless communication unit 110, audio data received from MIC, or audio data stored in the storage unit 120, in a call mode, a recording mode, a voice recognition mode, a broadcast reception mode, an image capturing mode, a situation recognition service execution mode, and the like. The SPK may also output a sound signal related to a function performed by the portable device. Examples of the function may include the feedback of situation information according to the execution of an action, the reception of a call connection, the transmission of a call connection, image capturing, the reproduction of media content (e.g., a music file and a moving image file), and the like.

The MIC receives, as input, an external sound signal and processes the external sound signal into an electrical voice data, in the call mode, the recording mode, the voice recognition mode, the image capturing mode, a voice recognition-based dictation execution mode, and the like. In the call mode, the processed voice data may be converted into a form transmissible to a mobile communication base station through the mobile communication module, and the voice data in the form transmissible to the mobile communication base station may be output. Various noise removal algorithms may be implemented in the MIC in order to remove noise generated in process of receiving the external sound signal as input.

The display unit 160 may include a touch panel and a display panel. The touch panel may be placed on the display panel. The touch panel generates an analog signal (e.g., a touch event) in response to a gesture by a user on the touch panel, Analog-to-Digital (A/D) converts the generated analog signal into a digital signal, and delivers the digital signal to the control unit 100.

The control unit 100 detects the gesture by the user from the delivered touch event. The control unit 100 controls functions in this example in response to the detected user's gesture. The user's gesture is divided into a touch and touch gesture.

Further, examples of the touch gesture may include a tap, a drag, a flick, and the like. Specifically, the term "touch" refers to a state of contacting the touch screen, and the term "touch gesture" refers to a change in a touch from a touch on the touch screen (touch-on) to the removal of the touch from the touch screen (touch-off).

The touch panel may be an integrated touch panel including a hand touch panel which senses a hand gesture, and a pen touch panel which senses a pen gesture. In this case, the hand touch panel may be implemented as a capacitive-type touch panel. It goes without saying that the hand touch panel may be implemented as a resistive-type touch panel, an infrared-type touch panel or an ultrasonic-type touch panel.

Also, the hand touch panel generates a touch event not only by the user's hand gesture, but may also generate a touch event by another object (e.g., an object made of a conductive material which can produce a change in capacitance). The pen touch panel may be implemented as an electromagnetic induction-type touch panel. Accordingly, the pen touch panel generates a touch event by using a stylus pen specially manufactured so as to be capable of forming a magnetic field.

The touch panel generates a touch event, and delivers the generated touch event to the control unit 100. The touch events may be divided into a touch, a tap, a press, a drag, a drag & drop, a flick, a drag & flick, and the like, according to actions thereof. Here, the touch is an action of contacting one point of the screen by a finger. The tap is an action of touching one point by the finger, and then removing (dropping) the finger from the relevant point without moving the finger. The press is an action of touching one point of the screen by the finger for a longer time period than in the case of the tap, and then removing the finger from the relevant point without moving the finger. The drag is an action of moving the finger in a predetermined direction in a state of touching one point of the screen by the finger. The drag & drop is an action of dragging the finger, and then removing the finger. The flick is an action of quickly moving the finger like a flicking action, and then removing the finger. Also, the drag & flick is an action of dragging the finger, and flicking the finger at a predetermined time point (i.e., an action of continuously performing the drag and the flick in a state where the finger contacts the touch panel). The control unit 100 may distinguish the flick from the drag based on a moving speed.

Under the control of the controller 100, the display panel converts image data received as input from the controller 100 into analog signals, and displays the analog signals. Specifically, the display panel displays various screens, such as a lock screen, a home screen, an environment setting screen, an application (hereinafter abbreviated as "App") execution screen, a keypad screen, and the like.

Particularly, in one example, the display panel may automatically display grouped serial files edited by the control unit 100, in one folder, and may display a file scheduled to be reproduced next according to order among the grouped serial files so as to enable the user to intuitively identify the file scheduled to be reproduced next. Herein, files may be grouped on a per-series basis, and the serial file groups may be stored in folders, respectively.

In another example, in order to display the file scheduled to be reproduced in such a manner as to emphasize the file, the file scheduled to be reproduced may be displayed at a foremost position among the multiple serial file groups, may be displayed so as to have the largest size among files displayed in the form of thumbnails (refer to FIG. 4) or a list (refer to FIG. 6), or may be displayed together with a preset special character, a preset symbol, a preset number, a preset item, and the like at one side of the file scheduled to be reproduced. The special character, the symbol, the number, and the item may represent an ordinal position of the file scheduled to be reproduced, the number of times of reproduction history thereof, a reproduction history order thereof, and the like. Also, the multiple serial file groups may be displayed in the form of a stack (refer to FIG. 5) obtained by stacking thumbnails respectively representing the multiple serial file groups.

The control unit 100 controls an overall operation of the portable device and a signal flow between the internal elements of the portable device, processes data, and controls the supply of power from a battery to the elements of the portable device. The control unit 100 may include a main memory which stores an application program and the OS, a cache memory which temporarily stores data to be written to the storage unit 120 and temporarily stores data read from the storage unit 120, a Central Processing Unit (CPU), a Graphics Processing Unit (GPU), and the like. Here, the OS manages computer resources, such as the CPU, the GPU, the main memory, the auxiliary memory and the like, while serving as an interface between hardware and a program.

Specifically, the OS operates the portable device, determines the order of tasks, and controls an arithmetic operation of the CPU and that of the GPU. Also, the OS performs a function of controlling the execution of an application program, a function of managing the storage of data and files, and the like.

Meanwhile, as is well known, the CPU is a core control unit of a computer system which performs calculations and comparisons of data, the interpretation and execution of instructions, and the like. In place of the CPU, the GPU is a graphic control unit which performs calculations and comparisons of graphic-related data, and the interpretation and execution of instructions, and the like. In each of the CPU and the GPU, two or more independent cores (e.g., a quad-core) may be integrated into one package composed of a single Integrated Circuit (IC). Alternatively, the CPU and the GPU may be integrated into one chip (i.e., System on Chip (SoC)). Alternatively, the CPU and the GPU may be packaged in a multi-layer. Meanwhile, a configuration including the CPU and the GPU may be referred to as an "Application Processor (AP)."

Particularly, the control unit 100 may group a series of files that are in a sequential order in one folder; track a reproduction progress of a most recently reproduced file; identify a next serial file to be reproduced in accordance with the sequential order, when the reproduction progress of the most recently reproduced file satisfies a preset threshold; store metadata associated with the next serial file in a storage unit, when the next serial file is identified; and display the next serial file at a particular position on a display unit to allow the user to intuitively identify the next serial file scheduled to be reproduced, when the folder is opened.

Here, the control unit 100 may determine whether each file is a serial file, based on at least one of an Identifier (ID) of content matched to each file, an ordinal position of the content, a time stamp of the content, an author of the content, a title of the content, a topic of the content, an acquisition path of each file, an acquisition scheme of each file, an acquisition date of each file and the like, which are stored in metadata of each file.

The control unit 100 may automatically store the identified serial files in one folder. At this time, the control unit 100 may store the identified serial files in the one folder in accordance with the sequential order by default. In another example, the control unit 100 may store different series of files in different folders, and may automatically set a title of each folder, including a title of a series, a topic of the series, an author of the series, a generation date, and the like.

In order to track the reproduction progress of a most recently reproduced file, the control unit 100 may track an elapsed reproduction time of the most recently reproduced file or may detect whether a predefined frame in the most recently reproduced file was reproduced.

In another example, a threshold for selecting or scheduling a next serial file in the series to be reproduced may be based on whether the elapsed reproduction time of the most recently reproduced file is above or equal to a preset threshold. Alternatively, a predefined frame in the most recently reproduced file may have been designated such that the predefined frame indicates that the second file can begin.

When control unit 100 detects that the elapsed reproduction time of the most recently reproduced file is above or equal to a preset threshold, the control unit 100 may select a file having the next ordinal position in the series. In contrast, when the elapsed reproduction time of the most recently reproduced file is below the preset threshold, the control unit 100 may continue reproduction of the most recently reproduced file. If no file in the series was reproduced, the control unit 100 may reproduce a file having the first ordinal position in the series of files.

When control unit 100 designates the file to be reproduced next in the series it may store the designated file. In one example, the control unit 100 may store information associated with the designated file in metadata associated with the folder in which the series is stored or in metadata associated with the next file itself.

The control unit 100 may display the next serial file to be reproduced at a particular position on a display. In one example, the control unit 100 may display the next serial file at a foreground position relative to other files in the series; may display the next serial file such that it has the largest size among the files in the series displayed in the form of thumbnails or a list; or may display the next serial file together with a preset special character, a preset symbol, a preset number, a preset item, and the like at one side of the next serial file. The special character, the symbol, the number, and the item may include an ordinal position of the next serial file, the number of times the next serial file was reproduced in the past, a reproduction history, and the like.

An example method for managing and displaying a file by the control unit 100 will be described in detail below.

Figure 2:
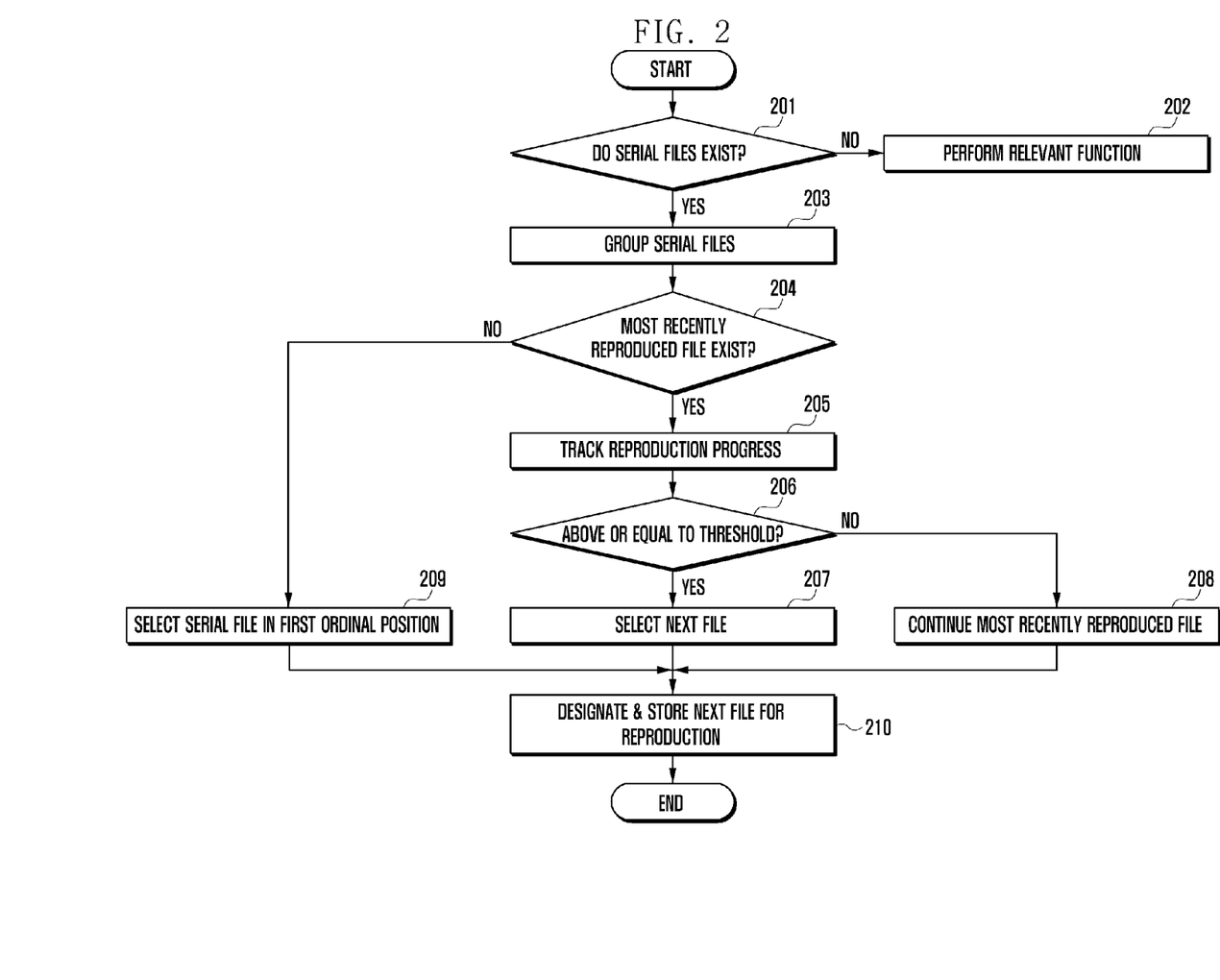
FIG. 2 and FIG. 3 are flowcharts each illustrating an example method for managing and displaying a file in accordance with aspects of the present disclosure.
Figure 3:
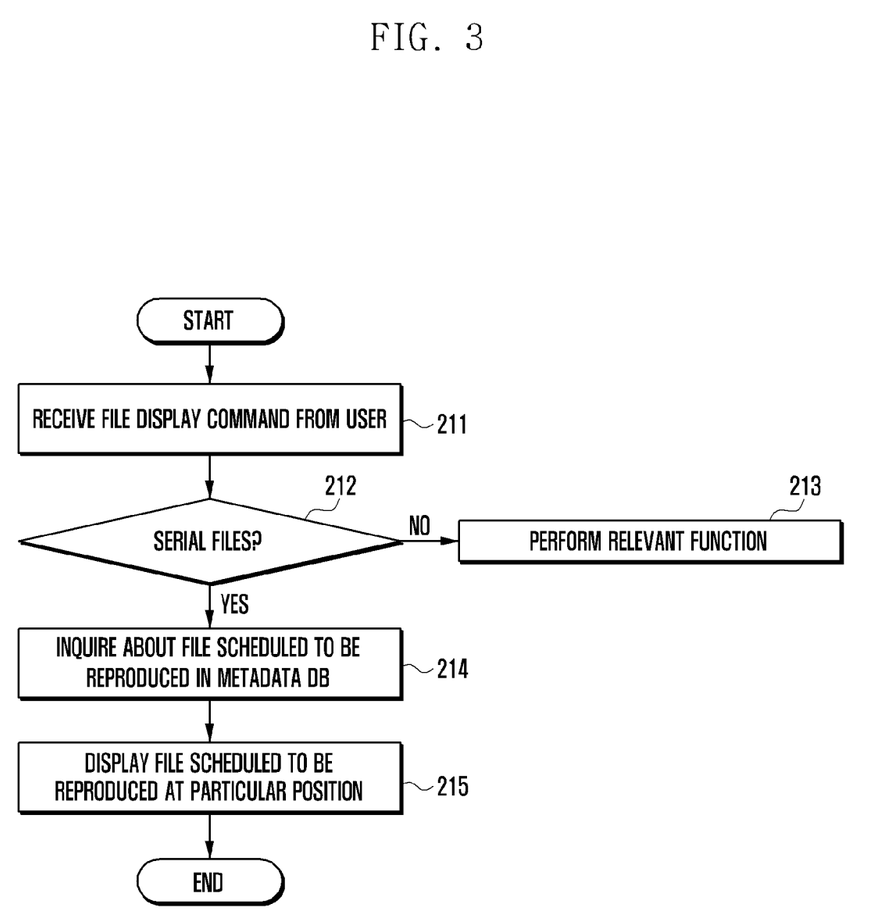

Referring to FIGS. 2 and 3, flowcharts illustrating example methods for managing and displaying a file are shown. In FIG. 2, control unit 100 determines whether a series of files exist in the storage unit 120, at block 201. For example, the control unit 100 may determine whether a series of files exist among multiple moving images in an upper folder in response to a video player icon being touched or clicked on. However, it is understood that the serial files are not limited to movie files, but may also be music or any other type of multimedia file.

The series of files may have a sequential order and each serial file in the series may have an ordinal position. The ordinal position of each file in a given series may be determined by a designer, when the series of files is generated. The ordinal positions may be stored in metadata. Alternatively, the ordinal positions may be set when content is downloaded from a provider server, a content server, or another device, and the set ordinal positions may be stored in the portable device. Alternatively, after downloading the content, the ordinal positions may be set by the user, and the set ordinal positions may be stored. However, it is understood that setting the ordinal position of each serial file can be done in a variety of ways.

The control unit 100 may determine whether each file is a serial file, based on at least one of an Identifier (ID) associated with content in each serial file, an ordinal position of the content, a time stamp of the content, an author of the content, a title of the content, a topic of the content, an acquisition path of each serial file, an acquisition scheme of each serial file, and an acquisition date of each serial file.

When determining at block 201 that the series of files exists, the control unit 100 groups the relevant files at block 203. In another example, if multiple series are detected, the serial files may be grouped in accordance with their respective series. Control unit 100 may automatically store an identified series of files in one folder. At this time, the control unit 100 may store the series of files in one folder in the sequential order of the series by default. Also, control unit 100 may store different series in different folders and may automatically set a title of each folder, including a title of the series, a topic, an author, a generation date, and the like.

In another example, when determining that a series of files does not exist at block 201, the control unit 100 performs a relevant function, such as independently storing each file, at block 202.

When the series of files have been grouped in a folder at block 203, the control unit 100 determines whether a most recently reproduced file exists in the series of files stored in the folder, at block 204.

For example, the control unit 100 may identify that, in a series A of 9 files (e.g., from a first ordinal position to a ninth ordinal position), one file was most recently reproduced. When a file in the series is the most recently reproduced file, the control unit 100 may extract this file. By way of example, when identifying that a file in the first ordinal position of the series was last reproduced at 10:00 a.m. on Apr. 1, 2013 and a file in the second ordinal position was last reproduced at 2:00 p.m. on Apr. 2, 2013, the control unit 100 may determine that the file having the second ordinal position is the most recently reproduced file.

At block 205, the control unit 100 tracks a reproduction progress of the most recently produced file identified at block 204. In this regard, control unit 100 may track the elapsed reproduction time of the most recently reproduced file, or may track whether a predefined frame in the most recently reproduced file was reproduced.

At block 206, the control unit 100 may identify whether the elapsed reproduction time of the most recently reproduced file at block 205 is above or equal to a preset threshold.

In one example, the threshold may be a preset ratio between the elapsed reproduction time of the file and a total reproduction time of the file. Alternatively, a predefined frame may be designated when the file was designed such that reproduction of the predefined frame indicates that the next serial file may be reproduced.

Accordingly, when tracking the reproduction progress of the most recently reproduced file, control unit 100 may determine whether the elapsed reproduction time is above or equal to a preset threshold, or may track whether a predefined frame in the file was reproduced.

By way of example, the control unit 100 may set the elapsed reproduction time threshold to be 95 percent of the total file time. When the elapsed reproduction time of a most recently reproduced file is 20 minutes and the total time of this file is 40 minutes, the elapsed reproduction time is only 50 percent of the total time, which is less than the 95 percent threshold.

When determining at block 206 that the reproduction progress of the most recently reproduced time is above or equal to the preset threshold, the control unit 100 selects a file corresponding to the next ordinal position in the series at block 207.

At block 207, the file corresponding to the next ordinal position may be determined in accordance with the sequential order of the series. For example, when there are 9 files of a series A, the following cases may be considered.

1) When the user reproduces the files in the order of the first, second and third ordinal positions, the file corresponding to the next ordinal position may be a file having the fourth ordinal position.

2) In contrast, when the user reproduces the files in the order of the ninth ordinal position and the eighth ordinal position, the file corresponding to the next ordinal position may be a file having the seventh ordinal position.

As described above, the next ordinal position may be determined according to a previous action pattern (e.g., the previous reproduction order) of the user.

Case 1 will now be discussed in more detail. In this instance, a usage history may indicate that the user has completed reproduction of the file having the first and second ordinal position in the series.

By way of example, a serial file having the second ordinal position in the series may be the most recently reproduced file in the series such that its elapsed reproduction time is 39 minutes and its total time is 40 minutes. In this example, the reproduction time period ratio is greater than or equal to 98 percent; thus, control unit 100 may select a file having the third ordinal position in the series to be reproduced next.

In contrast, if the elapsed time is below the preset threshold, the control unit 100 may continue playing the most recently reproduced file, at block 208. Referring back to the example above, if the file having the second ordinal position in the series was the most recently reproduced file such that its elapsed reproduction time was 20 minutes, the reproduction time ratio in this instance is 50 percent, which is less than the 95 percent threshold; thus, control unit 100 may continue reproducing the serial file in the second ordinal position.

Meanwhile, when determining at block 204 that no file in the series was the most recently reproduced file, control unit 100 may select a file corresponding to the first ordinal position in the series, at block 209.

At block 210, the control unit 100 may schedule the serial file selected in block 207, block 208 or block 209 for reproduction and may store the scheduled serial file. Information associated with the scheduled serial file may be stored in metadata corresponding to the folder in which the series of files is stored or in metadata associated with the scheduled serial file.

As described above with reference to FIG. 2, a portable device may automatically group different series of files such that the each serial file is grouped in accordance with the series to which it belongs. Furthermore, a serial file in a given series may be designated as the currently reproduced file in accordance with the sequential order of the series. A method in which the user can intuitively identify the serial file scheduled next in the series will now be described with reference to FIG. 3.

Referring to FIG. 3, control unit 100 may detect a file display command from the user, at block 211. Alternatively, the control unit 100 may detect a command to open the folder storing a series of files.

At block 212, control unit 100 may determine whether the file(s) corresponding to the file display command or the open folder command belong to an ordered series of files.

When determining at block 212 that the file(s) belong to an ordered series of files, control unit 100 may use a metadata database to identify which file in the series is scheduled to be reproduced next, at block 214.

At block 215, control unit 100 displays the next file to be reproduced at a particular position. At this time, control unit 100 may display the next file at a foremost position among the multiple serial file groups; control unit 100 may also display the next file so as to have the largest size among the series of files displayed in the form of thumbnails or a list; or, control unit 100 may display the next file together with a preset special character, a preset symbol, a preset number, a preset item, and the like at one side of the next file. The special character, the symbol, the number, and the item may include the ordinal position of the next file in the series, the number of times the next file was reproduced, and the like.

Figure 4:
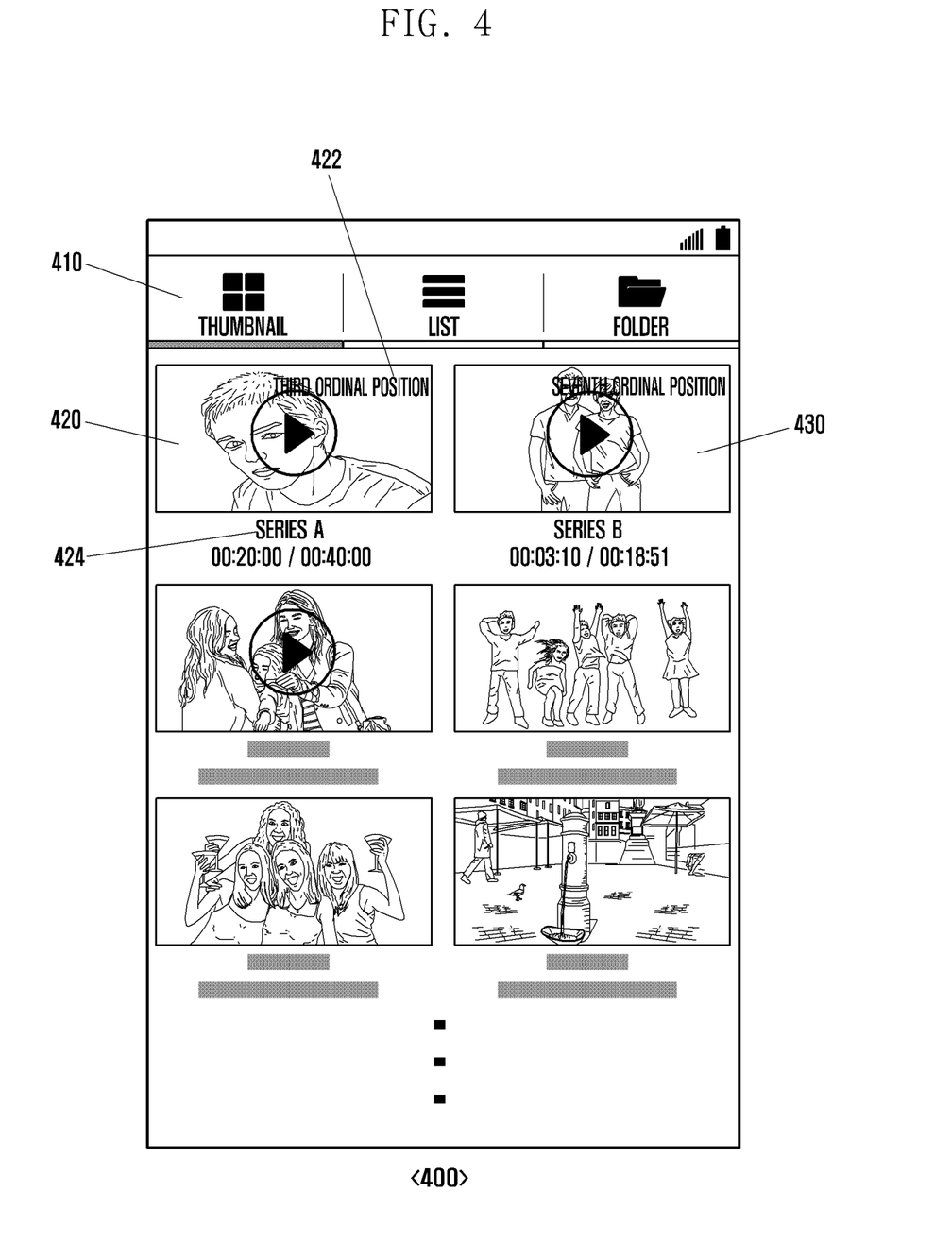
FIG. 4, FIG. 5, FIG. 6 and FIG. 7 are views each schematically illustrating an execution screen matched to the execution of managing and displaying a file, in accordance with aspects of the present disclosure.

Referring now to FIGS. 4 to 7, example execution screens are shown. In the example of FIG. 4, serial files 420 and 430 corresponding to series A and B respectively are displayed as thumbnails on a screen. The displayed serial file in each series may be the file scheduled to be reproduced next in each respective series. On an execution screen 400, a file having in the third ordinal position in series A is displayed as the serial file scheduled to be reproduced next in series A and a file having the seventh ordinal in series B is displayed as the serial file scheduled to be reproduced next in series B.

Each thumbnail matched to a serial file may display a reproduction item and may display an item 422. Item 422 may be a special symbol, a number or a character representing the ordinal position of the file scheduled to be reproduced next. Item 422 may be located at one side of each thumbnail together with the reproduction item. The user may reproduce the file by touching the reproduction item. In addition to the ordinal position, the number of times the file was reproduced, a reproduction history order, and the like may also be displayed. Moreover, the title of the respective series, a total reproduction time of the most recently reproduced file, etc. may be displayed on the execution screen 400 in response to each thumbnail. In addition, a series of files having the most recently reproduced serial file among all serial files across all series, may be displayed in an uppermost left part of execution screen 400.

Figure 5:
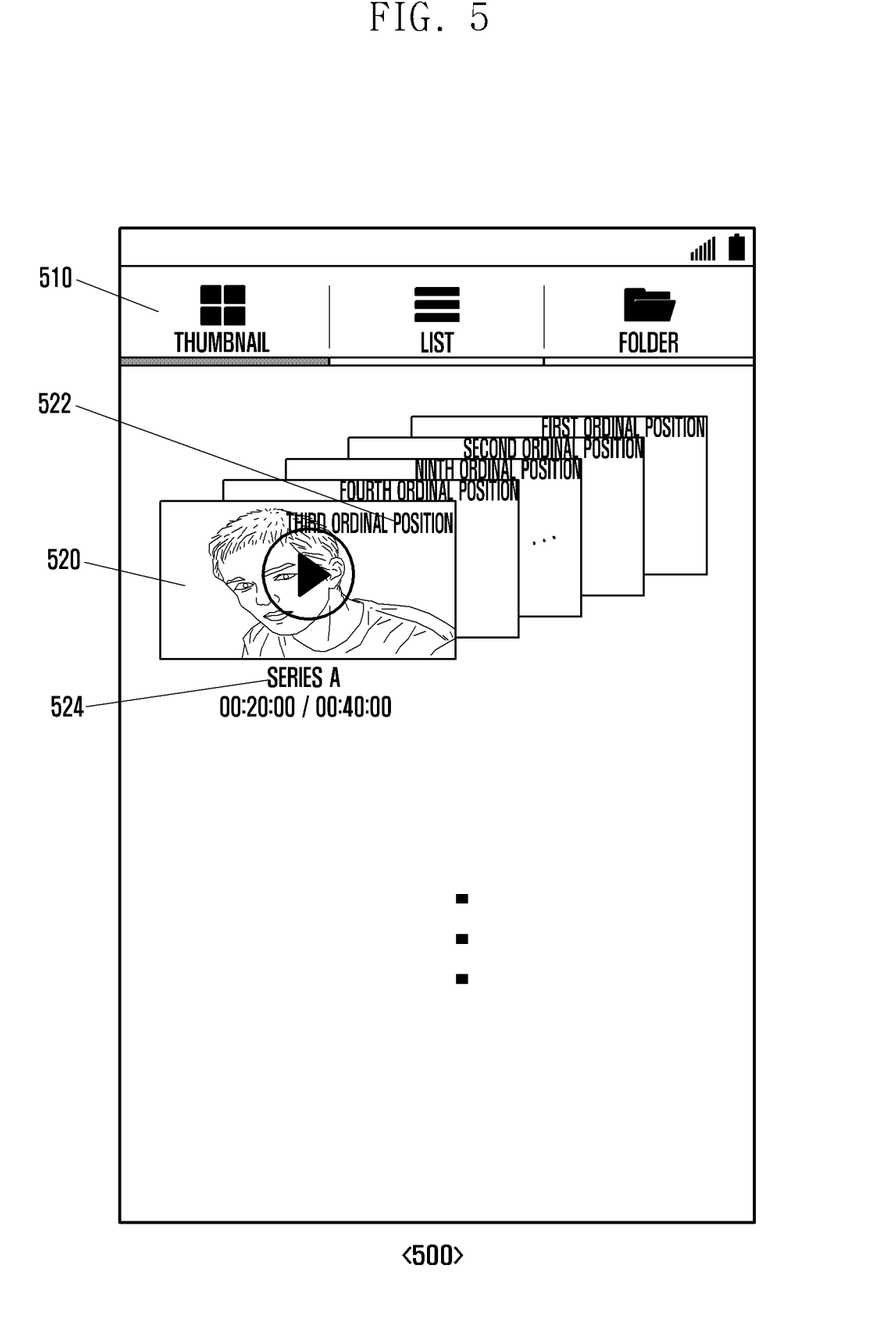

Referring to FIG. 5, an ordered series of files may be displayed in the form of a stack. For example, when the user touches or taps one serial file scheduled to be reproduced next in a particular series, multiple files in the series may be displayed in the form of a stack as illustrated in FIG. 5. They may be displayed each serial file in the series is at least partially overlaid with another file in the series in accordance with the sequential order.

In the stack structure shown in FIG. 5, the file scheduled to be reproduced next is displayed at a foremost position. Each file in the series may be arranged in accordance with its order of reproduction. Also, serial files whose reproduction is complete may be displayed at the end of the stack. In other words, serial files that have been completed may be arranged at the end of the stack and the serial files scheduled to be reproduced later may be arranged in accordance with the sequential order of the files. In FIG. 5, the serial file scheduled to be reproduced next, which is displayed at a foremost position, may be displayed so as to have the largest size relative to other files in the series. Information indicating that the file is scheduled to be reproduced next may alternatively be expressed using a special symbol, a character, a number, and the like.

As shown on execution screen 500, series A is shown having nine serial files. Furthermore, FIG. 5 shows the reproduction history of the files in the series in the form of a stack. In this example, the elapsed reproduction time of the file in the second ordinal position has met or exceeded the threshold or a predetermined frame in the file was reproduced. Accordingly, a file in the third ordinal position is displayed at an uppermost position of the stack structure to indicate that this file is scheduled to be reproduced next.

Figure 6:
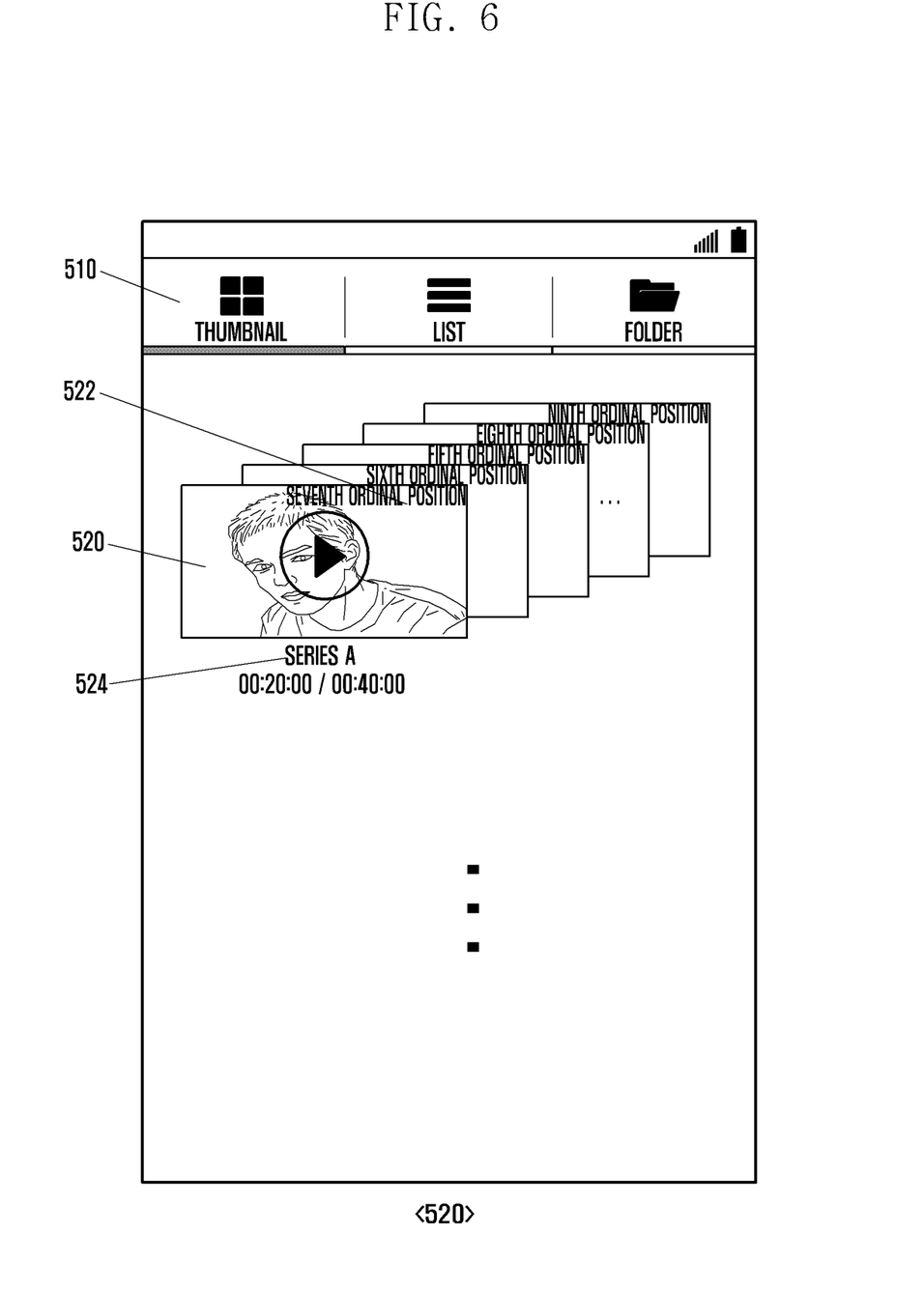

Referring now to FIG. 6, series A contains nine serial files. The reproduction history shown in the stack indicates that a user previously reproduced serial files in ordinal positions nine, eight, five, and then six. In this example, the elapsed reproduction time of the file in the eight ordinal position has met or exceeded the threshold or a predetermined frame in the file was reproduced. Accordingly, a file in the seventh ordinal position is displayed at an uppermost position of the stack to indicate that it's scheduled to be reproduced next. Additional ordered series of files may also be displayed as described above in parallel.

The above-described arrangement enables the user to intuitively recognize a file scheduled to be reproduced next. Completed files may be arranged at a rear position and each yet to be reproduced file may be arranged in accordance with its ordinal position in the series. In this regard, users may conveniently visualize the order of the files being reproduced.

Figure 7:
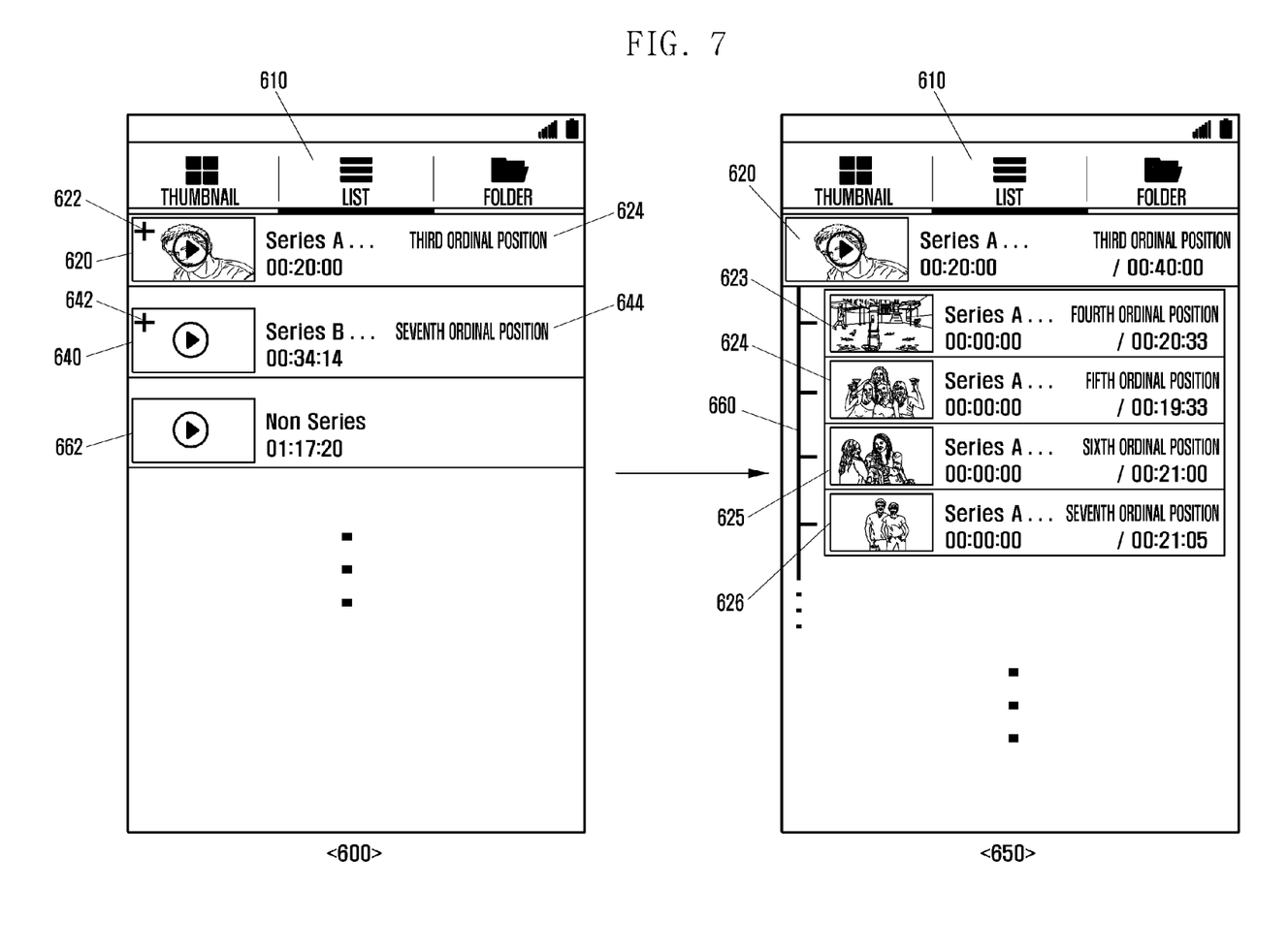

Referring to the example in FIG. 7, control unit 100 may display files 620 and 640 which are scheduled to be reproduced next in different series. A non-serial file 662 is also displayed in the form of a list, in response to a detected list display command. Display unit 160 may display a serial file scheduled to be reproduced next in each series such that the next serial file represents the series. For example, on execution screen 600, a file 620 in the third ordinal position of series A may be displayed so as to represent series A, a file 640 in the seventh ordinal position of series B may be displayed so as to represent series B, and a non-serial file 662 which does not belong to a series may be displayed at a lower end part of execution screen 600.

The file list may display a reproduction item associated with each file, and may display a special symbol, a number, a character or the like, which represents the ordinal position of the serial file scheduled to be reproduced next. Such special symbol, number, character or the like may be displayed at one side of the file list together with the series title and an elapsed reproduction time. The user may reproduce the file by touching the reproduction item. Also, the number of times the next serial file was reproduced may also be displayed together with the ordinal position thereof.

Furthermore, the title of the series, the total reproduction time of the next file, a previous reproduction time of the next file, etc. may be displayed on the execution screen in response to each thumbnail. In addition, when multiple series of files are displayed, the serial file that was most recently played across all series may be displayed in an uppermost part of a list display screen.

Meanwhile, when a file is a serial file, a symbol 622 or 642 such as "+" may be displayed at one side of the file. By way of example, when the user touches or taps the symbol 622 the other serial files 623 to 626 in series A may be sequentially displayed, as shown on execution screen 650.

Specifically, the serial files 623 to 626 having different ordinal positions may be displayed in sequential order. The serial files 623 to 626 may be tied to the next serial file to be reproduced 620 with an indication line 660. When the user touches or taps the indication line 660, only the next file to be reproduced 620 may be representatively displayed again, when the indication line 660 disappears.

The examples of the present disclosure disclosed in this specification and the accompanying drawings are merely particular examples provided in order to clearly describe the technical contents of the present disclosure and help understanding of the present disclosure, and are not intended to limit the scope of the present disclosure. It will be apparent to those having ordinary knowledge in the technical field of the present disclosure that other modified examples which are based on the technical spirit of other examples may be practiced in the present disclosure as well as the examples disclosed herein.

As described above, in accordance with aspects of the present disclosure, files having continuity can be automatically grouped in one folder and the grouped files can be stored in the one folder. Then, a file scheduled to be reproduced which needs to be reproduced next according to order among the grouped files may be displayed at a particular position, or may be displayed in a particular manner. Therefore, the user can intuitively identify the file scheduled to be reproduced.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method comprising:
   grouping a series of files in which the series of files are reproduced in a sequential order;
   tracking a reproduction progress of a most recently reproduced file, wherein the reproduction progress of the most recently reproduced file is incomplete and the most recently reproduced file is in a non-play state;
   identifying a next serial file from the series of files to be reproduced in accordance with the sequential order, when the reproduction progress of the most recently reproduced file exceeds a preset threshold and designating the next serial file as a new most recently reproduced file; and
   storing metadata associated with the next serial file, when the next serial file is identified.

2. The method of claim 1, further comprising:
   detecting a file display command;
   identifying, using the metadata, the next serial file scheduled to be reproduced next in the series, in response to the file display command; and
   displaying the next serial file at a particular position of a display.

3. The method of claim 2, wherein displaying the next serial file at the particular position comprises wherein the next serial file comprises video data, displaying the next serial file in a non-play state.

4. The method of claim 2, wherein displaying the next serial file at the particular position comprises:
   displaying the next serial file at an uppermost position of a stack structure comprising each serial file in the series such that each serial file in the stack is partially overlaid with another serial file in accordance with the sequential order; and
   displaying completely reproduced serial files at an end of the stack structure and the most recently displayed filed with the incomplete progression and non-play state.

5. The method of claim 2, wherein displaying the next serial file at the particular position comprises displaying the series of files in a list; and displaying the next serial file such that the next serial files represents the series of files in the list.

6. The method of claim 2, wherein displaying the next serial file at the particular position comprises at least one of:
   displaying the next serial file such that the next serial file has a largest size among the series of files; and
   displaying information associated with the next serial file by using at least one of a preset special character, a preset symbol, a preset number, a preset item at one side of the next serial file, an ordinal position of the next serial file in the series, a number of times the next serial file has been reproduced, and a reproduction history of the next serial file.

7. The method of claim 1, wherein tracking the reproduction progress comprises at least one of:
   identifying whether an elapsed reproduction time of the most recently reproduced file is above or equal to a preset threshold; and
   detecting whether a predefined frame in the most recently reproduced file has been reproduced.

8. The method of claim 1, wherein identifying the next serial file comprises:
   identifying the next serial file based on a reproduction history, when the reproduction history is detected; and
   identifying the next serial file based on a preset order, when the reproduction history is not detected.

9. The method of claim 1, wherein identifying the next serial file comprises at least one of:
identifying the next serial file, when an elapsed reproduction time of the most recently reproduced file is above or equal to a preset threshold; and
identifying the next serial file, when a predefined frame in the most recently reproduced file has been reproduced.

10. The method of claim 1, wherein the series of files are grouped based on at least one of an Identifier (ID) associated with content in each serial file, an ordinal position of the content, a time stamp of the content, an author of the content, a title of the content, a topic of the content, an acquisition path of each serial file, an acquisition scheme of each serial file, and an acquisition date of each serial file.

11. The method of claim 1, further comprising:
identifying the next serial file to be a serial file having a first ordinal position in the series of files, when the recently reproduced file cannot be identified in the grouped series of files.

12. An apparatus comprising:
a control unit to:
group a series of files in which the series of files are reproduced in a sequential order;
track a reproduction progress of a most recently reproduced file, wherein the reproduction progress of the most recently reproduced file is incomplete and the most recently reproduced file is in a non-play state;
identify a next serial file from the series of files to be reproduced next in accordance with the sequential order, when the reproduction progress of the most recently reproduced file exceeds a preset threshold and designating the next serial file as a new most recently reproduced file;
store metadata associated with the next serial file in a storage unit, when the next serial file is identified; and
display the next serial file at a particular position on a display unit.

13. The apparatus of claim 12, wherein to track the reproduction progress the control unit to further identify whether an elapsed reproduction time of the most recently reproduced file is above or equal to a preset threshold.

14. The apparatus of claim 13, wherein to track the reproduction progress the control unit to further detect whether a predefined frame in the most recently reproduced file was reproduced.

15. The apparatus of claim 12, wherein displaying the next serial file at the particular position causes the control unit to further display a second serial file on an idle screen.

16. The apparatus of claim 12, wherein to display the next serial file at the particular position the control unit to further:
display the next serial file at an uppermost position of a stack structure comprising each serial file in the series such that each serial file in the stack is partially overlaid with another serial file in accordance with the sequential order; and
display completely reproduced serial files at an end of the stack structure.

17. The apparatus of claim 12, wherein to display the next serial file at the particular position the control unit to further display the series of files in a list; and display the next serial file such that the next serial files represents the series of files in the list.

18. The apparatus of claim 12, wherein to display the next serial file at the particular position the control unit to further:
display the next serial file such that the next serial file has a largest size among the series of files; and
display information associated with the next serial file by using at least one of a preset special character, a preset symbol, a preset number, a preset item at one side of the next serial file, an ordinal position of the next serial file in the series, a number of times the next serial file has been reproduced, and a reproduction history of the next serial file.

* * * * *